US011948010B2

(12) United States Patent
Cropper et al.

(10) Patent No.: US 11,948,010 B2
(45) Date of Patent: Apr. 2, 2024

(54) TAG-DRIVEN SCHEDULING OF COMPUTING RESOURCES FOR FUNCTION EXECUTION

(71) Applicant: International Business Machines Corporation, Armonk, NY (US)

(72) Inventors: Joseph W. Cropper, Round Rock, TX (US); Duy Nguyen, Cary, NC (US); Jeffrey W. Tenner, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 374 days.

(21) Appl. No.: 17/068,433

(22) Filed: Oct. 12, 2020

(65) Prior Publication Data

US 2022/0114026 A1 Apr. 14, 2022

(51) Int. Cl.
G06F 9/50 (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS

| | | | | |
|---|---|---|---|---|
| 7,203,943 B2* | 4/2007 | Shaffer | ................. | G06F 9/5044 718/104 |
| 7,958,509 B2* | 6/2011 | Aridor | ................. | G06F 9/5011 718/100 |
| 7,984,445 B2* | 7/2011 | Benedetti | .............. | G06F 9/5055 717/155 |
| 8,074,222 B2* | 12/2011 | Hirai | ................... | G06F 11/1482 707/681 |
| 8,560,690 B2* | 10/2013 | Chandrasekaran | ......................... | H04L 67/1008 709/224 |

(Continued)

FOREIGN PATENT DOCUMENTS

| CN | 108021462 A | 5/2018 |
|---|---|---|
| CN | 110162413 A | 8/2019 |

(Continued)

OTHER PUBLICATIONS

Narayanan et al.; "Resource Matchmaking in Grid—Semantically"; ISBN 978-89-5519-131-8 93560; Feb. 12-14, 2007 ICACT2007; IEEE (Narayanan_2007.pdf; pp. 2051-2055) (Year: 2007).*

(Continued)

*Primary Examiner* — Hiren P Patel
(74) *Attorney, Agent, or Firm* — Garg Law Firm, PLLC; Rakesh Garg; Nathan Rau

(57) ABSTRACT

An embodiment includes extracting, by a scheduler, function-tag data associated with a function identified by a deployment request. The embodiment also includes selecting, by the scheduler, a computing device within a server cluster to host the function based at least in part on a comparison of the function-tag data and host-tag data associated with the computing device. The embodiment also includes issuing, by the scheduler, an instruction to the computing device, wherein the issuing of the instruction causes an allocation of resources for hosting execution of the function.

21 Claims, 8 Drawing Sheets

(56) References Cited

U.S. PATENT DOCUMENTS

| | | | |
|---|---|---|---|
| 8,799,421 B1* | 8/2014 | Hutchison | G06F 9/5044 709/227 |
| 9,537,865 B1 | 1/2017 | Borovoy et al. | |
| 9,794,343 B2* | 10/2017 | Hebert | G06F 9/5038 |
| 9,928,108 B1* | 3/2018 | Wagner | G06F 9/45533 |
| 10,262,390 B1* | 4/2019 | Sun | G06F 9/5077 |
| 10,761,821 B1* | 9/2020 | Eble | G06T 1/20 |
| 10,789,100 B2* | 9/2020 | You | G06F 9/5038 |
| 11,431,794 B2* | 8/2022 | Yang | H04L 12/46 |
| 2005/0015504 A1* | 1/2005 | Dorne | G06Q 10/04 709/229 |
| 2005/0081208 A1* | 4/2005 | Gargya | G06F 9/4881 718/100 |
| 2006/0184657 A1 | 8/2006 | Rezvani et al. | |
| 2009/0113442 A1* | 4/2009 | Deidda | G06F 9/5044 718/105 |
| 2010/0186010 A1* | 7/2010 | Chalemin | G06F 9/5077 718/1 |
| 2011/0010634 A1* | 1/2011 | Hatasaki | G06F 9/5011 709/226 |
| 2011/0145319 A1* | 6/2011 | Dolan | H04L 47/765 726/1 |
| 2011/0145830 A1* | 6/2011 | Yamaguchi | G06F 9/52 718/104 |
| 2011/0154350 A1* | 6/2011 | Doyle | H04L 67/61 718/104 |
| 2012/0016721 A1* | 1/2012 | Weinman | G06Q 30/02 705/7.35 |
| 2012/0311022 A1* | 12/2012 | Watanabe | G06F 9/5083 709/203 |
| 2013/0346994 A1* | 12/2013 | Chen | G06F 9/5044 718/104 |
| 2014/0331235 A1* | 11/2014 | Lee | G06F 9/5027 718/104 |
| 2015/0295849 A1* | 10/2015 | Xia | H04L 41/40 370/235 |
| 2016/0182403 A1* | 6/2016 | Sarkar | G06F 9/45558 709/226 |
| 2016/0241547 A1 | 8/2016 | Nguyen et al. | |
| 2016/0342438 A1* | 11/2016 | Cropper | G06F 9/45558 |
| 2017/0097851 A1* | 4/2017 | Chen | G06F 9/45558 |
| 2017/0153918 A1* | 6/2017 | Guo | G06F 9/5027 |
| 2017/0206115 A1* | 7/2017 | Shimojou | H04L 41/5054 |
| 2018/0239633 A1* | 8/2018 | Li | G06F 9/45558 |
| 2018/0260253 A1* | 9/2018 | Nanda | G06F 11/3476 |
| 2018/0314555 A1* | 11/2018 | Auvenshine | G06F 9/5011 |
| 2019/0004868 A1* | 1/2019 | Zhou | G06T 1/20 |
| 2019/0044886 A1* | 2/2019 | Bernat | H04L 12/66 |
| 2019/0050258 A1* | 2/2019 | Kim | G06F 9/5011 |
| 2019/0079804 A1* | 3/2019 | Thyagarajan | G06F 9/5077 |
| 2019/0146848 A1* | 5/2019 | Rastogi | G06F 9/5061 718/104 |
| 2019/0244294 A1 | 8/2019 | Shao et al. | |
| 2019/0303207 A1* | 10/2019 | Vadapandeshwara | G06F 9/5038 |
| 2019/0384655 A1 | 12/2019 | Krishna Singuru | |
| 2020/0026997 A1* | 1/2020 | Yang | G06N 3/0454 |
| 2020/0076885 A1* | 3/2020 | Marvin | G06F 9/5072 |
| 2020/0104177 A1* | 4/2020 | Inokuchi | G06F 9/5011 |
| 2020/0120112 A1 | 4/2020 | Cybulski | |
| 2020/0133537 A1* | 4/2020 | Haghighat | G06F 9/5044 |
| 2020/0183744 A1* | 6/2020 | Kim | H04L 67/1008 |
| 2020/0186445 A1* | 6/2020 | Govindaraju | H04L 67/34 |
| 2020/0389410 A1* | 12/2020 | Guim Bernat | H04L 67/2866 |
| 2021/0194971 A1* | 6/2021 | Thum | H04M 3/5183 |
| 2021/0263779 A1* | 8/2021 | Haghighat | G06F 9/5061 |
| 2022/0027197 A1* | 1/2022 | Tang | G06F 9/5072 |
| 2022/0391258 A1* | 12/2022 | Szabó | G06F 9/45558 |

FOREIGN PATENT DOCUMENTS

| | | |
|---|---|---|
| CN | 110502911 A | 11/2019 |
| EP | 3602299 A1 | 2/2020 |
| KR | 20190016895 A | 2/2019 |
| WO | 2019031783 A1 | 2/2019 |
| WO | 2020037162 A1 | 2/2020 |

OTHER PUBLICATIONS

Sun et al.; "Resource-Aware Task Scheduling and Placement in Multi-FPGA System"; IEEE Access; Digital Object Identifier 10.1109/ACCESS.2019.2952434; (Sun_2019.pdf; pp. 163851-163863) (Year: 2019).*

Xu et al; "A Heterogeneity-Aware Task Scheduler for Spark"; 2018 IEEE International Conference on Cluster Computing; (Xu_2018.pdf; pp. 245-256) (Year: 2018).*

Jacobs et al.; "Affinity Measurement for NFV-enabled Networks: A Criteria-based Approach"; IEEE 2017; (Jacobs_2017.pdf; pp. 1-9) (Year: 2017).*

International Searching Authority, PCT/CN2021/113409, dated Oct. 28, 2021.

P201906177GB01, Application No. GB2304605.5, Patents Act 1977: Examination Report under Section 18(3), dated May 4, 2023.

P201906177GB01, Application No. GB2304605.5, Reply to examination report, dated Jun. 29, 2023.

* cited by examiner

TAG-DRIVEN SCHEDULING OF COMPUTING RESOURCES FOR FUNCTION EXECUTION

BACKGROUND

The present invention relates generally to a method, system, and computer program product for managing allocation of computing resources in a server cluster. More particularly, the present invention relates to a method, system, and computer program product for tag-driven scheduling of computing resources for function execution.

Serverless computing refers to a computing model in which developers are able to run code on remote servers on an as-needed basis. This type of computing model is typically referred to as cloud computing. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Many cloud computing service providers now offer Function as a Service (FaaS) capabilities. FaaS allows software developers to divide applications into many much smaller components, or "functions," that can be invoked on-demand, without executing the entire application. dedicated service process. The FaaS framework also completely abstracts servers away from developers, thus allowing developers to deploy functions free from the burden of managing the infrastructure and resources that would otherwise be necessary for hosting a network-accessible application.

SUMMARY

The illustrative embodiments provide for tag-driven scheduling of computing resources for function execution. An embodiment includes extracting, by a scheduler, function-tag data associated with a function identified by a deployment request. The embodiment also includes selecting, by the scheduler, a computing device within a server cluster to host the function based at least in part on a comparison of the function-tag data and host-tag data associated with the computing device. The embodiment also includes issuing, by the scheduler, an instruction to the computing device, wherein the issuing of the instruction causes an allocation of resources for hosting execution of the function. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
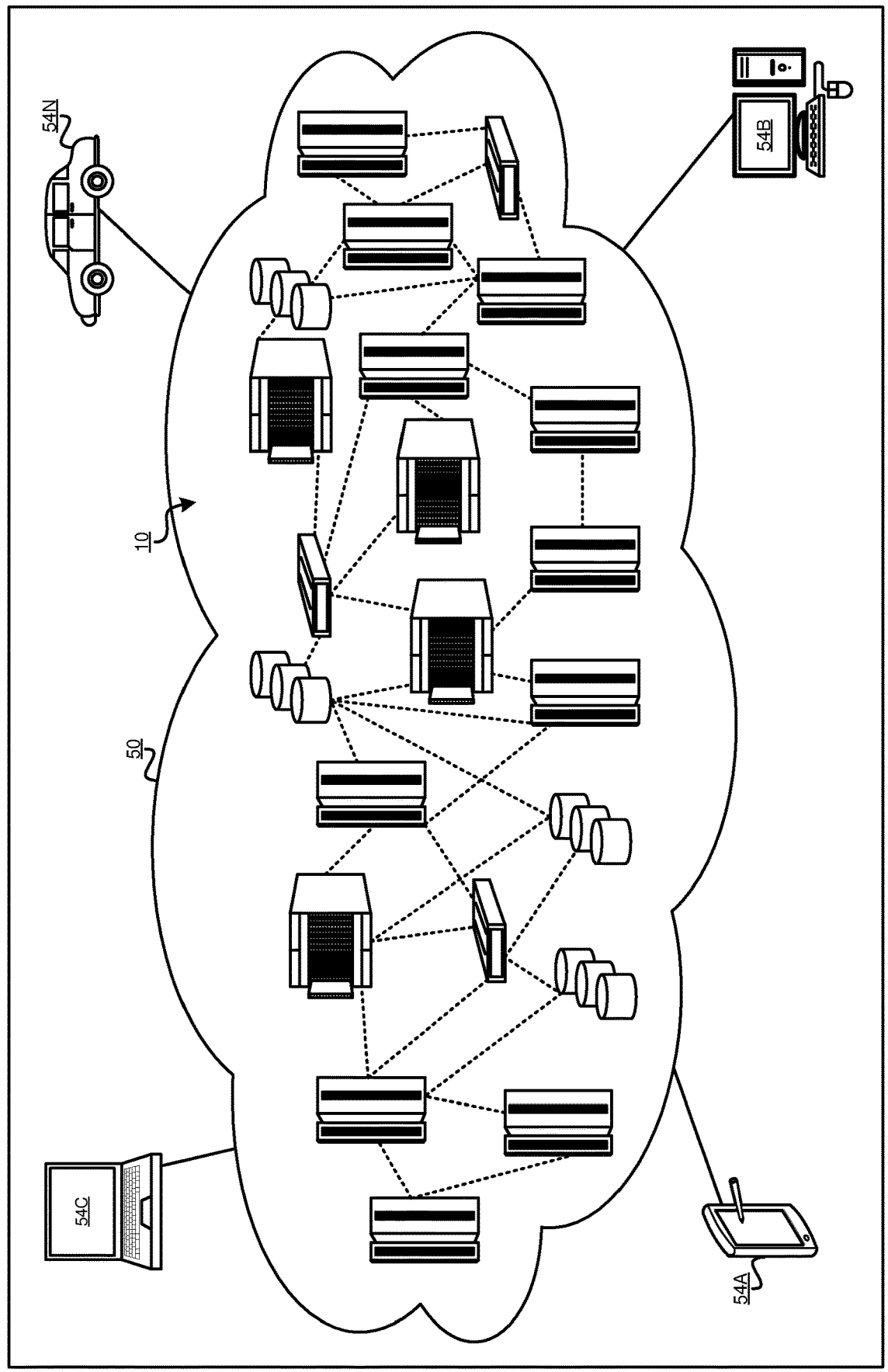
FIG. 1 depicts a cloud computing environment according to an embodiment of the present invention.

Function as a Service is quickly growing in popularity for many reasons. For example, utilizing the FaaS model provides a flexible way of adding scalability and resiliency to an application's architecture. Transitioning existing applications to a FaaS architecture may also reduce costs as computing resources are typically allocated according to the requirements of an application. The FaaS architecture is auto-scalable, allowing an application to expand to adapt to spikes in traffic or workload, and then scale back down as the traffic or workload declines, which helps prevent application down-time and expenditure of unnecessary expenses. lowers to help in reducing the costs. FaaS also relieves developers from the burden of maintaining servers and networking equipment, allowing them to focus on application development.

While these benefits of FaaS architecture make it an attractive deployment option, the present embodiments recognize that in some cases, the performance of a function depends on an amount or type of available host resources. The term "host resources," as used herein, refers to resources on a cloud hosting device that are available for use by a function executing on the host, and include computer resources (e.g., type or number of CPUs and/or GPUs), networking resources (e.g., bandwidth, SmartNIC capable), storage resources (e.g., amount of RAM, availability of VRAM, SSD or optical drive), and other I/O device resources.

One of the key benefits of FaaS is that a developer may define a function and ask for it to be deployed without regard to the platform, and the cloud infrastructure deploys the function and scales as necessary. Unfortunately, this simplicity means the owner of the function does not give the cloud infrastructure the information it needs to adequately optimize the function. For example, a function that performs an artificial intelligence (AI) training routine that is deployed with a FaaS provider is deployed without the FaaS provider knowing what type of function it is, so the FaaS provider may schedule the function to run on a computing platform that lacks accelerators or other advantages for running the AI workload. This means that resulting function execution times could potentially be orders of magnitude slower than if the function was scheduled to a more appropriate compute node (e.g., with a GPU).

The illustrated embodiments address these issues by providing for tag-driven scheduling of computing resources for function execution. In the illustrated embodiment, tag-driven scheduling involves the use of function placement tags in the FaaS lifecycle. For example, in some embodiments, a well-defined set of function placement "tags" are created and used by function developers and FaaS providers that can be assigned to both the infrastructure compute nodes (by IT admins) as well as function containers (by function developers). In some such embodiments, the tags are then used as a mechanism to match (or not match) functions to the most appropriate infrastructure node. In some embodiments, for increased flexibility, the tags may include additional metadata related to affinity/anti-affinity preferences or requirements, and/or may include additional metadata related to aspects of the tag matching being mandatory or just preferred.

Illustrative embodiments that provide for tag-driven scheduling of computing resources allow for improved server selection by providing functions with the most appropriate or best available (e.g., with respect to speed of execution and/or deployment costs) underlying compute node. Using the placement tag information, the cloud infrastructure stores information on related placement policies for the function so as the function is placed, the cloud infrastructure uses the provided function-tag information together with other information it gathers such as expected run time for alternative platforms, per time-unit cost for alternative platforms, availability of resource, time savings by running on the same machine as previously run (affinity), etc. to determine the best available server placement for the function. For the sake of clarity, the following non-limiting examples of tags for a function and for a host are provided:

| Resource | Function Tag | Host Tag |
| --- | --- | --- |
| GPU present | exploit-gpu | has-gpu=true |
| 64 bit architecture | commodity | arch=x86-64 |
| Flash memory | flash_storage | storage=flash-attached |
| SSD Drive | ssd_storage | storage=ssd-attached |
| FPGA present | exploit-fpga | has-fpga=true |
| SmartNIC network adapter | smart_nic | network=smart-nic-attached |

Numerous other tags may be used in addition to, and/or as alternatives to, the above examples. In some embodiments, a FaaS service provider or other entity provides a list of function tags that developers may use that will be recognized by the FaaS service. In some embodiments, the tags may be modified to indicate whether the function tag is mandatory, preferred, or optional. For example, in some embodiments, an exclamation mark may be added to the end of the tag to indicate that the function tag is mandatory. In some embodiments, the tags may be modified to indicate an order of priority for multiple tags.

In an illustrative embodiment, a system that offers FaaS services includes a computing resource manager or cloud manager and manages several computing resources. In some embodiments, the computing resource manager includes a user interface and a scheduling module. In some embodiments, the computing resource manager allows a remote user, such as an application developer, to submit a deployment request to the computing resource manager through the user interface. The computing resource manager will respond to the deployment request by deploying the function on a computing resource with the help of a tag interpreter.

In some embodiments, the tag interpreter checks the deployment request for function-tag data representative of placement tags for the function sought to be deployed. If any tags are found, the tag interpreter searches for computing resources having matching or corresponding host-tag data. For example, in some embodiments, host tags for all of the computing resources are stored in a database, in which case the tag interpreter queries the database for matching tag data. In other embodiments, the tag interpreter polls computing resources for tags. In some such embodiments, the tag interpreter only checks computing resources that are known to have capacity and satisfy other criteria that may be relevant, such as affinity/anti-affinity or geolocation rules. For example, in some embodiments, the tag interpreter may receive such a list from the computing resource manager or from a scheduling module.

In some embodiments, the computing resource manager provides placement of functions on physical computer resources based on collocation rules, situational enforcement policies, and tag-matching rules set by a system administrator. Tag-matching rules are rules that specify how function-tag data and host-tag data should be compared and considered when selecting a server to host a function, including when and whether to invoke hard or soft enforcement of the tag-matching rule. Hard enforcement of a tag-matching rule can means that a host server must satisfy some aspect of the function-tag data in order to host the associated function, which is strictly enforced despite the circumstances or situation. Conversely, soft enforcement of a rule means that a host server may not necessarily satisfy some aspect of the function-tag data in order to host the associated function, and thus placement of the function may be done at the discretion of the scheduler mechanism regardless of the function-tag data corresponding to the function being placed.

In some embodiments, a computer resource manager deploys the function to a computing resource using a scheduling module based on satisfaction of various rules and policies, including the tag-matching rules. For example, in some embodiments, the scheduling module issues an instruction to the computing resource to allocate resources for hosting execution of the function. In some embodiments, the scheduling module maintains a resource database or the like that indicates where various functions have been deployed. In some embodiments, the resource database includes function identifiers for each function and resource identifiers for each computing resource and associates each function with the specific computing resource on which the function is hosted.

In some embodiments, the computing resource manager allows a remote user device to submit a function call to the computing resource manager. For example, the remote user device may be a data processing system, server, or client device as described in connection with FIGS. 7 and 8, a computer, smartphone, or IoT device. In some embodiments, the function call includes a reference to a function that includes function-tag data.

In some embodiments, when a function is called, the function may either be in a dormant state and stored in a memory, or may deployed and running on a computing resource. If the function is already deployed, the scheduling module refers the function call to the host computing resource for execution of the function in response to the function call. Otherwise, if the called function is not deployed, the scheduling module responds to the function call by performing placement of the function on an available computing resource from among a plurality of computing resources.

In some embodiments, when computing resource manager receives a function call, and the scheduling module previously selected a computing resource for hosting the called function, the computing resource manager checks for stored information in a resource database to determine where the called function is assigned (i.e., to which computing resource). In some such embodiments, the scheduling module receives information from the resource database indicating that function is assigned to a particular computing resource. In some such embodiments, the scheduling module notifies the particular computing resource of the function call and directs the function call to the particular computing resource. In some such embodiments, the computing resource responds to the notification from the scheduling module by allocating space in memory for hosting the function and directs the function call to a function host, which receives the function call and handles execution of the function in response to the function call.

In some embodiments, when computing resource manager receives a function call, if the function has not been assigned to a computing resource, the scheduling module selects a computing resource based on various situational enforcement policies, such as server availability, geographic proximity to a client device calling the function, and load balancing policies, as well as tag-matching rules. In some embodiments, the computing resource includes memory that stores a deployed function and computing resources tag data, which is an example of host-tag data. In some embodiments, the computing resource also includes a system interface that communicates with a system interface of the computing resource manager. For example, in some embodiments, the computing resource may request the tag data from the computing resource and store the tag data with host-tag data from other computing resources as computing resources tag data in a database.

In some embodiments, when a computing resource manager receives a function call, a scheduling module responds to the function call by employing a tag interpreter to compare the function-tag data associated with the called function to the tag data for various computing resources, including computing resource. Upon selecting computing resource for deployment of a function, the scheduling module notifies the computing resource of the function deployment and of the function call and directs the function call to computing resource. In some such embodiments, the computing resource responds to the notification from scheduling module by allocating space in memory for hosting the function and directs the function call to function host, which receives the function call and handles execution of the function in response to the function call.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
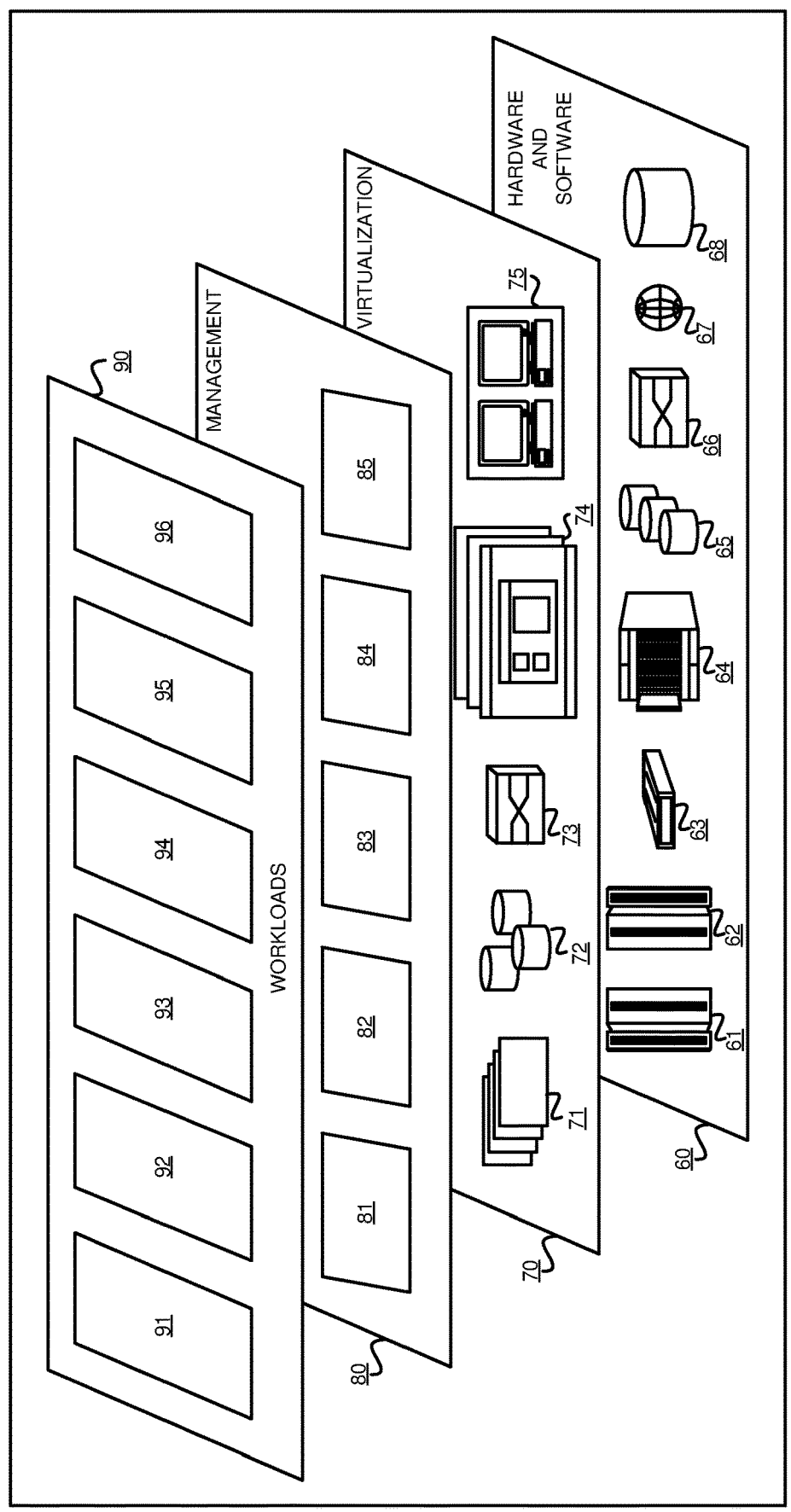
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads management 96.

Figure 3:
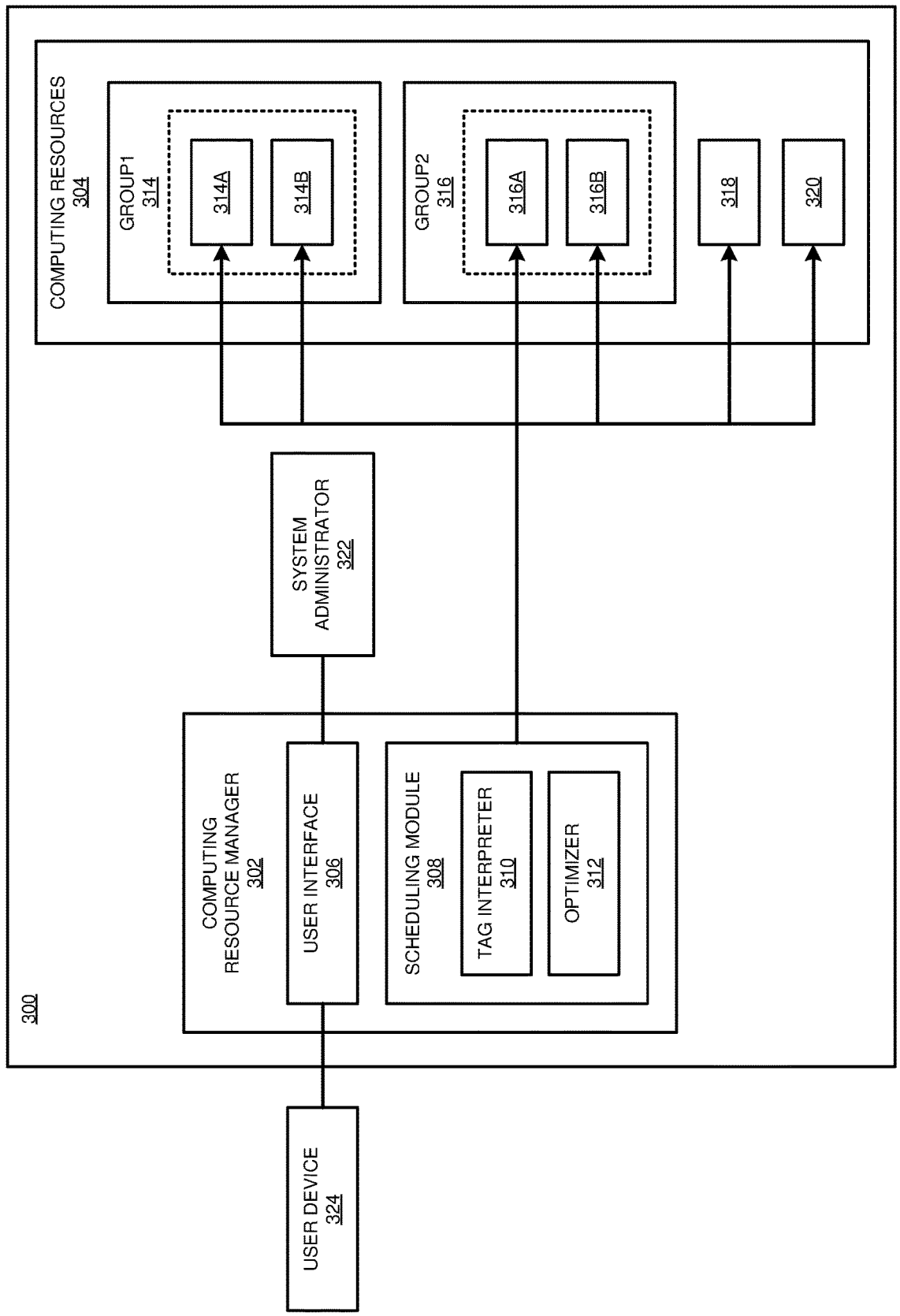
FIG. 3 depicts a block diagram of an example system comprising a scheduling application in accordance with an illustrative embodiment.

With reference to FIG. 3, this figure depicts a block diagram of an example system 300 comprising a scheduling application as scheduling module 308 in accordance with an illustrative embodiment. In some embodiments, the scheduling module 308 is deployed in cloud computing environment of FIG. 1, for example in workloads layer 90 of FIG. 2. By way of example, in some embodiments, scheduling module 308 is implemented as workload management 96 in FIG. 2.

In the illustrated embodiment, system 300 includes a computing resource manager 302 and computing resources 304. For example, in some embodiments, the system 300 is a cloud computing environment that supports FaaS architecture, where the computing resource manager 302 serves as a cloud manager and computing resources 304 includes cloud-computing server clusters.

In the illustrated embodiment, computing resource manager 302 includes user interface 306 and scheduling module 308. In the illustrated embodiment, the computing resource manager 302 allows a system administrator 322 or a remote user device 324 to set up and manage computing resources 304 through the user interface 306. In the illustrated embodiment, scheduling module 308 performs placement of functions on physical resources based on various situational enforcement policies, such as server availability, geographic proximity to a client device calling the function, and load balancing policies. For example, in the illustrated example, scheduling module 308 includes an optimizer 312 that monitors the performance of computing resources 304 to determine when migration needs to occur and supports the scheduling module 308 in load-balancing migrations according to policies set by a system administrator 322.

In the illustrated embodiment, the computing resource manager 302 allows the system administrator 322 to set up and manage hardware computing resources 304. Computing resources 304 represents computer resources such as physical host servers in a cloud computing environment. In the illustrated embodiment, the computing resources 304 includes two groups of servers, where servers 314a and 314b are grouped into server group 314 and servers 316a and 316b are grouped into server group 316. In some embodiments, a server group is a logical grouping of one or more servers managed by the computing resource manager 302. In some embodiments, computing resources 304 may include a large number of physical servers (not shown) arranged into one or more server groups. The server groups may be hosted on one or more physical hosts in the host groups. In the illustrated embodiment, computing resources 304 also includes servers 318 and 320 that are not in server groups.

In some embodiments, computing resource manager 302 provides placement of functions on physical computer resources based on collocation rules and situational enforcement policies set by a system administrator. Examples of collocation rules are affinity and anti-affinity. An affinity rule specifies a relationship where a function is placed with related functions in a group on one or more physical hosts. Similarly, an anti-affinity rule specifies that a function is not to be placed with other functions belonging to the same group on the same physical host. A situational enforcement policy as used herein means a situation or set of circumstances where a policy dictates whether to invoke hard or soft enforcement of the collocation rule. Hard enforcement of a rule means that the collocation rule (affinity or anti-affinity) is strictly enforced despite the circumstances or situation. Conversely, soft enforcement of a rule means the collocation rule may not necessarily be enforced, and thus placement of the function may be done at the discretion of the scheduler mechanism regardless of the affinity or anti-affinity rule corresponding to the function being placed.

In the illustrated embodiment, the scheduling module 308 also includes a tag interpreter 310. In some embodiments, computing resource manager 302 provides placement of functions on physical computer resources based on tag-matching rules set by a system administrator. Tag-matching rules are rules that specify how function-tag data and host-tag data should be compared and considered when selecting a server to host a function, including when and whether to invoke hard or soft enforcement of the tag-matching rule. Hard enforcement of a tag-matching rule can means that a host server must satisfy some aspect of the function-tag data in order to host the associated function, which is strictly enforced despite the circumstances or situation. Conversely, soft enforcement of a rule means that a host server may not necessarily satisfy some aspect of the function-tag data in order to host the associated function, and thus placement of the function may be done at the discretion of the scheduler mechanism regardless of the function-tag data corresponding to the function being placed.

Figure 4:
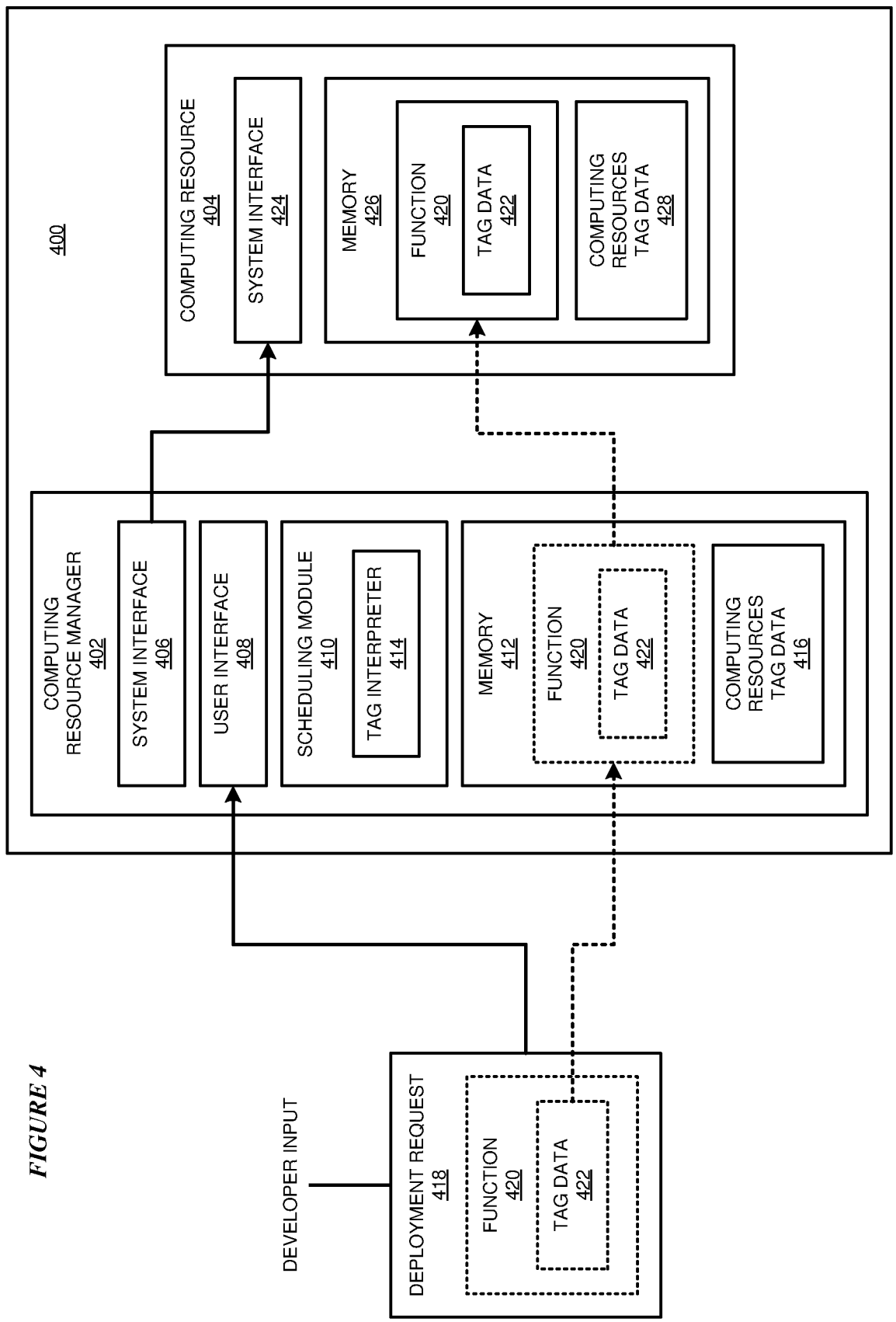
FIG. 4 depicts a block diagram of an example system comprising a scheduling application deploying a function in accordance with an illustrative embodiment.

With reference to FIG. 4, this figure depicts a block diagram of an example system 400 comprising a scheduling application as scheduling module 410 deploying a function in accordance with an illustrative embodiment. In some embodiments, the scheduling module 410 is deployed in cloud computing environment of FIG. 1, for example in workloads layer 90 of FIG. 2. By way of example, in some embodiments, scheduling module 410 is implemented as workload management 96 in FIG. 2.

In the illustrated embodiment, system 400 includes a computing resource manager 402 and computing resource 404. For example, in some embodiments, the system 400 is a cloud computing environment that supports FaaS architecture, where the computing resource manager 402 serves as a cloud manager and computing resource 404 includes cloud-computing server capabilities.

In the illustrated embodiment, computing resource manager 402 includes user interface 408 and scheduling module 410. In the illustrated embodiment, the computing resource manager 402 allows a remote user, such as an application developer, to submit a deployment request 418 to computing resource manager 402 through the user interface 408. In the illustrated embodiment, the deployment request 418 includes a function 420 that includes function-tag data 422. In the illustrated embodiment, scheduling module 410 responds to the deployment request 418 by performing placement of the function 420 on an available computing resource from among a plurality of computing resources 304 as shown in FIG. 3.

In FIG. 4, the scheduling module 410 selects computing resource 404 based on various situational enforcement policies, such as server availability, geographic proximity to a client device calling the function, and load balancing policies, as well as tag-matching rules. In the illustrated embodiment, the computing resource 404 includes memory 426 that stores a deployed function 420 and computing resources tag data 428, which is an example of host-tag data. In the illustrated embodiment, the computing resource 404 also includes a system interface 424 that communicates with a system interface 406 of the computing resource manager 402. For example, in the illustrated example, computing resource 404 may request the tag data 428 from the computing resource 404 and store the tag data 428 with host-tag data from other computing resources as computing resources tag data 416 in memory 412. In some embodiments, when the computing resource manager 402 receives a deployment request 418, scheduling module 410 responds to the deployment request 418 by temporarily storing the function 420 along with its associated tag data 422 in memory 412. The scheduling module 410 also employs a tag interpreter 414 to compare the function-tag data 422 to the tag data 416 for various computing resources, including computing resource 404.

In some embodiments, computing resource manager 402 provides placement of functions on physical computer resources based on collocation rules, situational enforcement policies, and tag-matching rules set by a system administrator. Tag-matching rules are rules that specify how function-tag data and host-tag data should be compared and considered when selecting a server to host a function, including when and whether to invoke hard or soft enforcement of the tag-matching rule. Hard enforcement of a tag-matching rule can means that a host server must satisfy some aspect of the function-tag data in order to host the associated function, which is strictly enforced despite the circumstances or situation. Conversely, soft enforcement of a rule means that a host server may not necessarily satisfy some aspect of the function-tag data in order to host the associated function, and thus placement of the function may be done at the discretion of the scheduler mechanism regardless of the function-tag data corresponding to the function being placed. In the illustrated embodiment, the function 420 is eventually deployed to the computing resource 404 by the scheduling module 410 based on satisfaction of various rules and policies, including the tag-matching rules. For example, in some embodiments, the scheduling module 410 issues an instruction to the computing resource 404 via system interface 406 and system interface 424 to allocate resources for hosting execution of the function 420. In some embodiments, the scheduling module 410 maintains a resource database (e.g., resource database 534 of FIG. 5) or the like that indicates where various functions have been deployed, and the scheduling module 410 updates the resource database that the function 420 is being deployed and executed by the computing resource 404.

Figure 5:
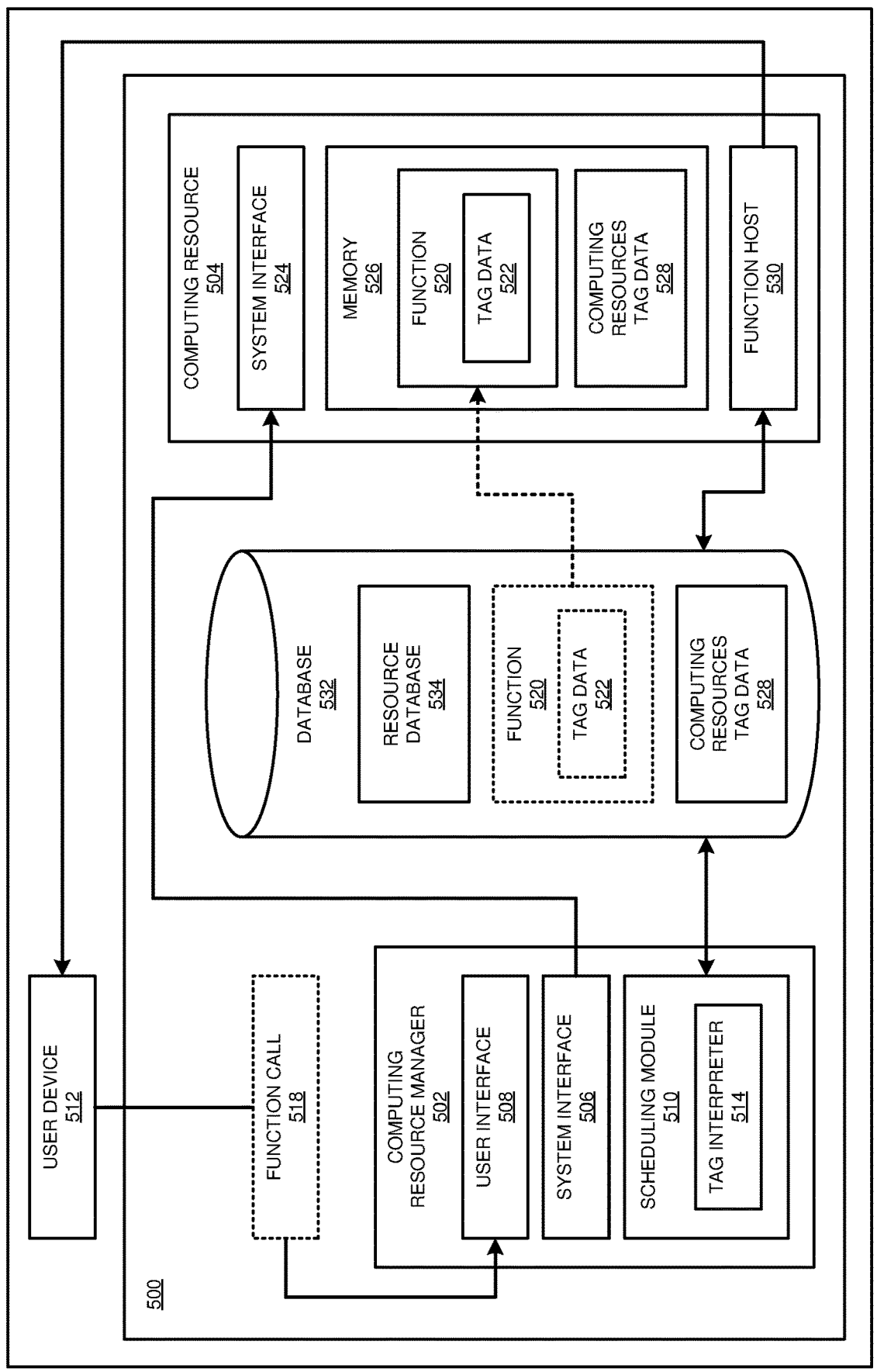
FIG. 5 depicts a block diagram of an example system comprising a scheduling application responding to a function call in accordance with an illustrative embodiment.

With reference to FIG. 5, this figure depicts a block diagram of an example system 500 comprising a scheduling application as scheduling module 510 responding to a function call in accordance with an illustrative embodiment. In some embodiments, the scheduling module 510 is deployed in cloud computing environment of FIG. 1, for example in workloads layer 90 of FIG. 2. By way of example, in some embodiments, scheduling module 510 is implemented as workload management 96 in FIG. 2.

In the illustrated embodiment, system 500 includes a computing resource manager 502 and computing resource 504. For example, in some embodiments, the system 500 is a cloud computing environment that supports FaaS architecture, where the computing resource manager 502 serves as a cloud manager and computing resource 504 includes cloud-computing server capabilities.

In the illustrated embodiment, computing resource manager 502 includes user interface 508 and scheduling module 510. In the illustrated embodiment, the computing resource manager 502 allows a remote user device 512 to submit a function call 518 to computing resource manager 502 through the user interface 508. In the illustrated embodiment, the function call 518 includes a reference to a function 520 that includes function-tag data 522. In the illustrated embodiment, the function 520 may either be in a dormant state and stored in a database 532, or may already be deployed on a computing resource 504. If the function is already deployed, the scheduling module 510 refers the function call 518 to the computing resource 504 for execution of the function 520 in response to the function call 518. Otherwise, if the function 520 is not deployed, the scheduling module 510 responds to the function call 518 by performing placement of the function 520 on an available computing resource from among a plurality of computing resources 304 as shown in FIG. 3.

In some embodiments, the scheduling module 510 previously selected computing resource 504 and stored information in a resource database 534 indicating that function 520 is assigned to computing resource 504. In some such embodiments, the scheduling module 510 checks the resource database 534 for deployment information for function 520, receives information from resource database 534 indicating that function 520 is assigned to computing resource 504. In some such embodiments, the scheduling module 510 notifies the computing resource 504 via system interface 506 and system interface 524 of the computing resource 504 of the function call 518 and directs the function call 518 to computing resource 504. In some such embodiments, the computing resource 504 responds to the notification from scheduling module 510 by allocating space in memory 526 for hosting the function 520 and directs the function call 518 to function host 530, which receives the function call 518 and handles execution of the function 520 in response to the function call 518.

In some embodiments, if the function 520 has not been assigned to a computing resource, the scheduling module 510 selects computing resource 504 based on various situational enforcement policies, such as server availability, geographic proximity to a client device calling the function, and load balancing policies, as well as tag-matching rules. In the illustrated embodiment, the computing resource 504 include memory 526 that stores a deployed function 520 and computing resources tag data 528, which is an example of host-tag data. In the illustrated embodiment, the computing resource 504 also includes a system interface 524 that communicates with a system interface 506 of the computing resource manager 502. For example, in the illustrated example, computing resource 504 may request the tag data 528 from the computing resource 504 and store the tag data 528 with host-tag data from other computing resources as computing resources tag data 516 in database 532. In some embodiments, when the computing resource manager 502 receives a function call 518, scheduling module 510 responds to the function call 518 by employing a tag interpreter 514 to compare the function-tag data 522 associated with the called function 520 to the tag data 516 for various computing resources, including computing resource 504. Upon selecting computing resource 504 for deployment of function 520, the scheduling module 510 notifies the computing resource 504 via system interface 506 and system interface 524 of the computing resource 504 of the function 520 deployment and of the function call 518 and directs the function call 518 to computing resource 504. In some such embodiments, the computing resource 504 responds to the notification from scheduling module 510 by allocating space in memory 526 for hosting the function 520 and directs the function call 518 to function host 530, which receives the function call 518 and handles execution of the function 520 in response to the function call 518.

In some embodiments, computing resource manager 502 provides placement of functions on physical computer resources based on collocation rules, situational enforcement policies, and tag-matching rules set by a system administrator. Tag-matching rules are rules that specify how function-tag data and host-tag data should be compared and considered when selecting a server to host a function, including when and whether to invoke hard or soft enforcement of the tag-matching rule. Hard enforcement of a tag-matching rule can means that a host server must satisfy some aspect of the function-tag data in order to host the associated function, which is strictly enforced despite the circumstances or situation. Conversely, soft enforcement of a rule means that a host server may not necessarily satisfy some aspect of the function-tag data in order to host the associated function, and thus placement of the function may be done at the discretion of the scheduler mechanism regardless of the function-tag data corresponding to the function being placed. In the illustrated embodiment, the function 520 is eventually deployed to the computing resource 504 by the scheduling module 510 based on satisfaction of various rules and policies, including the tag-matching rules. For example, in some embodiments, the scheduling module 510 issues an instruction to the computing resource 504 via system interface 506 and system interface 524 to allocate resources for hosting execution of the function 520. In some embodiments, the scheduling module 510 maintains a resource database 534 (e.g., resource database 534 of FIG. 5) or the like that indicates where various functions have been deployed, and the scheduling module 510 updates the resource database that the function 520 is being deployed and executed by the computing resource 504.

Figure 6:
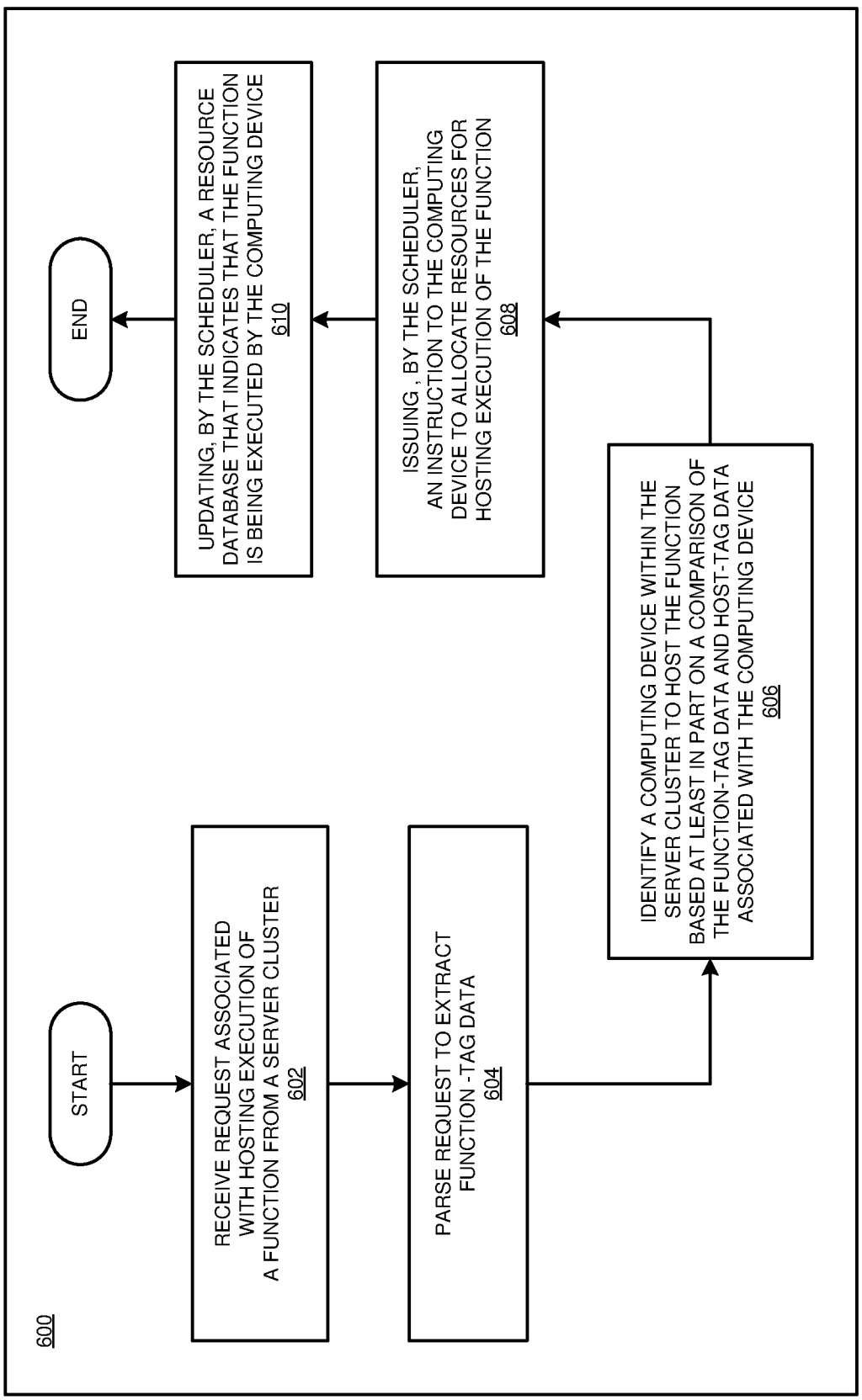
FIG. 6 depicts a flowchart of an example process for tag-driven scheduling of computing resources for function execution in accordance with an illustrative embodiment.

With reference to FIG. 6, this figure depicts a flowchart of an example process 600 for tag-driven scheduling of computing resources for function execution in accordance with an illustrative embodiment. In some embodiments, the process 600 is performed by a scheduling module deployed in cloud computing environment of FIG. 1, for example in workloads layer 90 of FIG. 2. By way of example, in some embodiments, the process 600 is performed by a scheduling module that is implemented as workload management 96 in FIG. 2.

In an embodiment, at block 602, the scheduling module receives a request associated with hosting execution of a function from a server cluster. Next, at block 604, the scheduling module parses a request to extract function-tag data. In some embodiments, the scheduling module detects the function-tag data associated with a function identified by the request. In some embodiments, the request is associated with hosting execution of the function within a server cluster. In some embodiments, the scheduling module receives the request as a deployment request that includes source code for the function. In some such embodiments, the scheduling module parses the deployment request into data segments and detects the function-tag data in at least one of the data segments.

Next, at block 606, the scheduling module identifies a computing device within the server cluster to host the function based at least in part on a comparison of the function-tag data and host-tag data associated with the computing device. In some embodiments, the scheduling module searches a resource database to determine if the function has already been assigned to a computing resource. In some embodiments, the scheduling module searches computing resources tag data for host-tag data that most closely matches the function-tag data. identifying an indication of a first rule in the function-tag data that must be enforced when deploying the function. In some embodiments, the first rule in the function-tag data identifies a type of computing hardware that must be available on a computing resource that hosts the function. In some embodiments, the scheduling module identifies an indication of a second rule in the function-tag data that is not required to be enforced when deploying the function. In some embodiments, the scheduling module detects that the computing device satisfies the first rule in the function-tag data, and detects that the computing device does not satisfy the second rule in the function-tag data. In some embodiments, the scheduling module identifies a portion of the host-tag data indicating a presence of the type of computing hardware that must be available on the computing resource that hosts the function.

Next, at block 608, the scheduling module issues an instruction to the computing device to allocate resources for hosting execution of the function. Finally, at block 610, the scheduling module updates a resource database that indicates that the function is being executed by the computing device.

Figure 7:
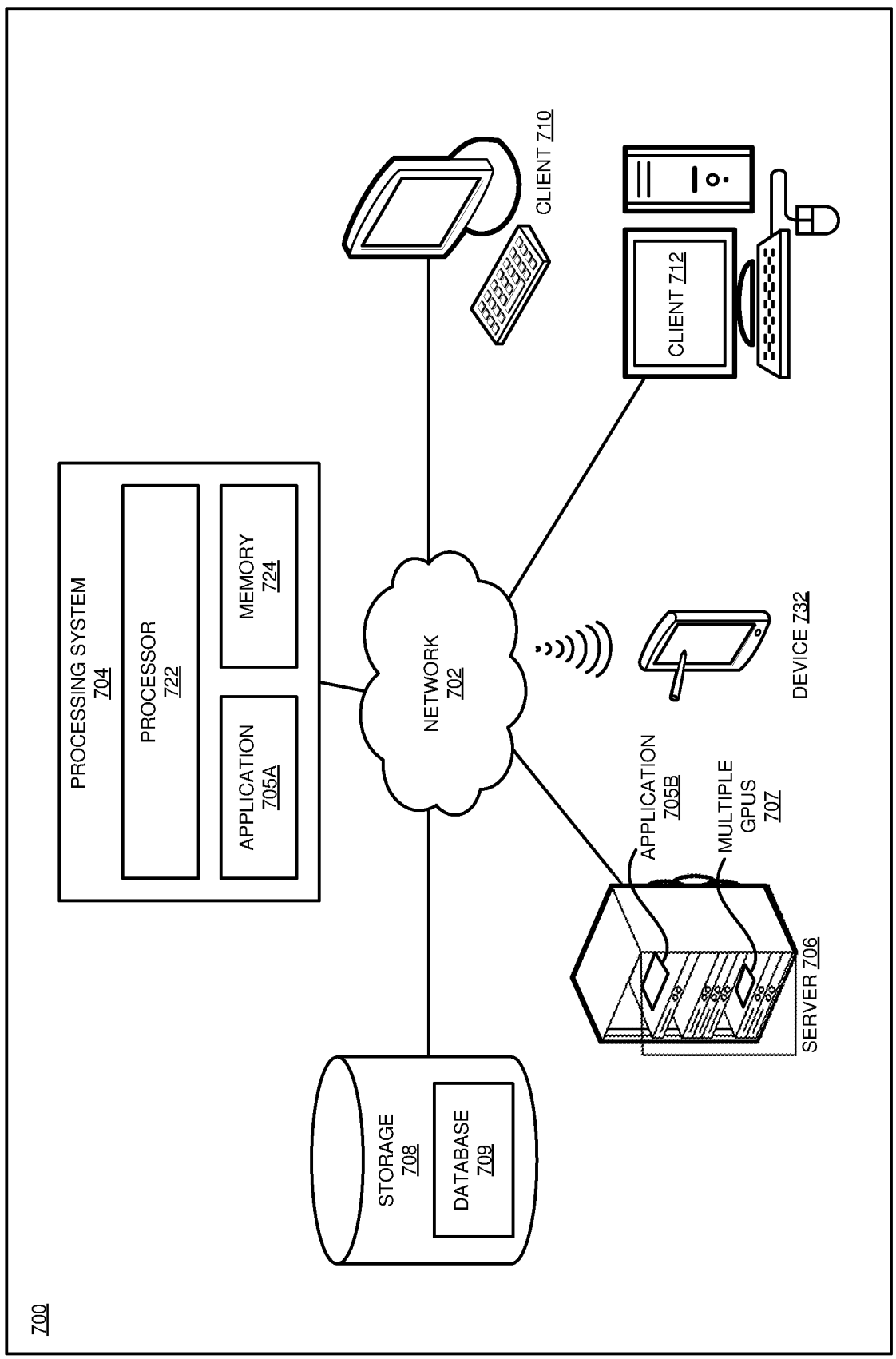
FIG. 7 depicts a block diagram of a network of data processing systems in which illustrative embodiments may be implemented.
Figure 8:
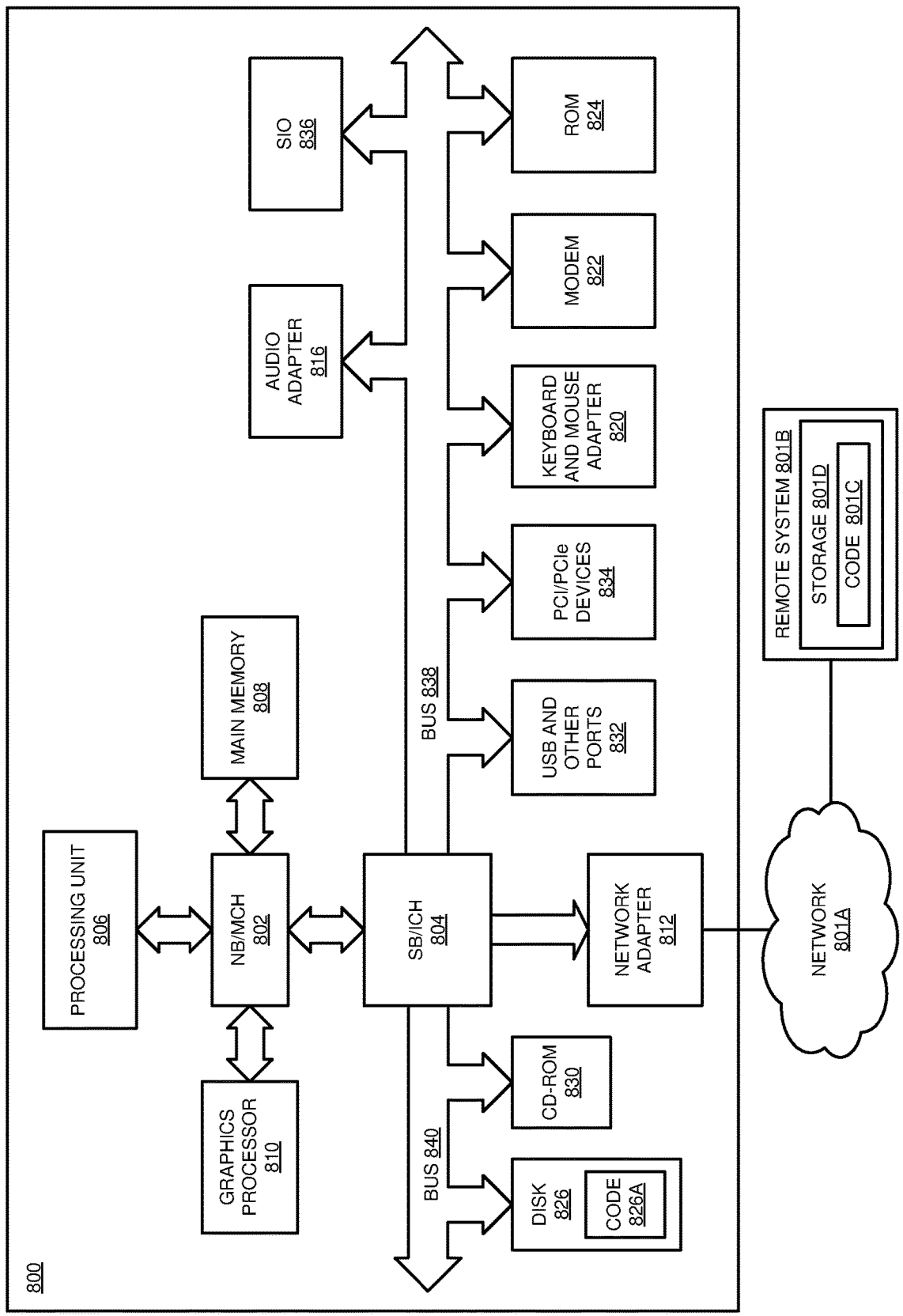
FIG. 8 depicts a block diagram of a data processing system in which illustrative embodiments may be implemented.

With reference to the figures and in particular with reference to FIGS. 7 and 8, these figures are example diagrams of data processing environments in which illustrative embodiments may be implemented. FIGS. 7 and 8 are only examples and are not intended to assert or imply any limitation with regard to the environments in which different embodiments may be implemented. A particular implementation may make many modifications to the depicted environments based on the following description.

FIG. 7 depicts a block diagram of a network of data processing systems in which illustrative embodiments may be implemented. Data processing environment 700 is a network of computers in which the illustrative embodiments may be implemented. Data processing environment 700 includes network 702. Network 702 is the medium used to provide communications links between various devices and computers connected together within data processing environment 700. Network 702 may include connections, such as wire, wireless communication links, or fiber optic cables.

Clients or servers are only example roles of certain data processing systems connected to network 702 and are not intended to exclude other configurations or roles for these data processing systems. Data processing system 704 couples to network 702. Software applications may execute on any data processing system in data processing environment 700. Any software application described as executing in processing system 704 in FIG. 7 can be configured to execute in another data processing system in a similar manner. Any data or information stored or produced in data processing system 704 in FIG. 7 can be configured to be stored or produced in another data processing system in a similar manner. A data processing system, such as data processing system 704, may contain data and may have software applications or software tools executing computing processes thereon. In an embodiment, data processing system 704 includes memory 724, which includes application 705A that may be configured to implement one or more of the data processor functions described herein in accordance with one or more embodiments.

Server 706 couples to network 702 along with storage unit 708. Storage unit 708 includes a database 709 configured to store data as described herein with respect to various embodiments, for example image data and attribute data. Server 706 is a conventional data processing system. In an embodiment, server 706 includes an application 705B that may be configured to implement one or more of the processor functions described herein in accordance with one or more embodiments.

Clients 710, 712, and 714 are also coupled to network 702. A conventional data processing system, such as server 706, or client 710, 712, or 714 may contain data and may have software applications or software tools executing conventional computing processes thereon.

Only as an example, and without implying any limitation to such architecture, FIG. 7 depicts certain components that are usable in an example implementation of an embodiment. For example, server 706, and clients 710, 712, 714, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 706, 710, 712, and 714 also represent example nodes in a cluster, partitions, and other configurations suitable for implementing an embodiment.

Device 732 is an example of a conventional computing device described herein. For example, device 732 can take the form of a smartphone, a tablet computer, a laptop computer, client 710 in a stationary or a portable form, a wearable computing device, or any other suitable device. In an embodiment, device 732 sends requests to server 706 to perform one or more data processing tasks by application 705B such as initiating processes described herein of the registry server. Any software application described as executing in another conventional data processing system in FIG. 7 can be configured to execute in device 732 in a similar manner. Any data or information stored or produced in another conventional data processing system in FIG. 7 can be configured to be stored or produced in device 732 in a similar manner.

Server 706, storage unit 708, data processing system 704, and clients 710, 712, and 714, and device 732 may couple to network 702 using wired connections, wireless communication protocols, or other suitable data connectivity. Clients 710, 712, and 714 may be, for example, personal computers or network computers.

In the depicted example, server 706 may provide data, such as boot files, operating system images, and applications to clients 710, 712, and 714. Clients 710, 712, and 714 may be clients to server 706 in this example. Clients 710, 712, 714, or some combination thereof, may include their own data, boot files, operating system images, and applications. Data processing environment 700 may include additional servers, clients, and other devices that are not shown.

In the depicted example, memory 724 may provide data, such as boot files, operating system images, and applications to processor 722. Processor 722 may include its own data, boot files, operating system images, and applications. Data processing environment 700 may include additional memories, processors, and other devices that are not shown.

In the depicted example, data processing environment 700 may be the Internet. Network 702 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 700 also may be implemented as a number of different types of networks, such as for example, an intranet, a local area network (LAN), or a wide area network (WAN). FIG. 7 is intended as an example, and not as an architectural limitation for the different illustrative embodiments.

Among other uses, data processing environment 700 may be used for implementing a host-server container-enabled environment in which the illustrative embodiments may be implemented. A host-server container-enabled environment enables containerized software applications and data to be distributed across a network such that an application functions by using the interactivity between a conventional client data processing system and a conventional server data processing system. Data processing environment 700 may also employ a service-oriented architecture where interoperable software components distributed across a network may be packaged together as coherent business applications. Data processing environment 700 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 8, this figure depicts a block diagram of a data processing system in which illustrative embodiments may be implemented. Data processing system 800 is an example of a conventional computer, such as data processing system 704, server 706, or clients 710, 712, and 714 in FIG. 7, or another type of device in which computer usable program code or instructions implementing the processes may be located for the illustrative embodiments.

Data processing system 800 is also representative of a conventional data processing system or a configuration therein, such as conventional data processing system 732 in FIG. 7 in which computer usable program code or instructions implementing the processes of the illustrative embodiments may be located. Data processing system 800 is described as a computer only as an example, without being limited thereto. Implementations in the form of other devices, such as device 732 in FIG. 7, may modify data processing system 800, such as by adding a touch interface, and even eliminate certain depicted components from data processing system 800 without departing from the general description of the operations and functions of data processing system 800 described herein.

In the depicted example, data processing system 800 employs a hub architecture including North Bridge and memory controller hub (NB/MCH) 802 and South Bridge and input/output (I/O) controller hub (SB/ICH) 804. Processing unit 806, main memory 808, and graphics processor 810 are coupled to North Bridge and memory controller hub (NB/MCH) 802. Processing unit 806 may contain one or more processors and may be implemented using one or more heterogeneous processor systems. Processing unit 806 may be a multi-core processor. Graphics processor 810 may be coupled to NB/MCH 802 through an accelerated graphics port (AGP) in certain implementations.

In the depicted example, local area network (LAN) adapter 812 is coupled to South Bridge and I/O controller hub (SB/ICH) 804. Audio adapter 816, keyboard and mouse adapter 820, modem 822, read only memory (ROM) 824, universal serial bus (USB) and other ports 832, and PCI/PCIe devices 834 are coupled to South Bridge and I/O controller hub 804 through bus 838. Hard disk drive (HDD) or solid-state drive (SSD) 826 and CD-ROM 830 are coupled to South Bridge and I/O controller hub 804 through bus 840. PCI/PCIe devices 834 may include, for example, Ethernet adapters, add-in cards, and PC cards for notebook computers. PCI uses a card bus controller, while PCIe does not. ROM 824 may be, for example, a flash binary input/output system (BIOS). Hard disk drive 826 and CD-ROM 830 may use, for example, an integrated drive electronics (IDE), serial advanced technology attachment (SATA) interface, or variants such as external-SATA (eSATA) and micro-SATA (mSATA). A super I/O (SIO) device 836 may be coupled to South Bridge and I/O controller hub (SB/ICH) 804 through bus 838.

Memories, such as main memory 808, ROM 824, or flash memory (not shown), are some examples of computer usable storage devices. Hard disk drive or solid-state drive 826, CD-ROM 830, and other similarly usable devices are some examples of computer usable storage devices including a computer usable storage medium.

An operating system runs on processing unit 806. The operating system coordinates and provides control of various components within data processing system 800 in FIG. 8. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 800.

Instructions for the operating system, the object-oriented programming system, and applications or programs, such as application 705 in FIG. 7, are located on storage devices, such as in the form of code 826A on hard disk drive 826, and may be loaded into at least one of one or more memories, such as main memory 808, for execution by processing unit 806. The processes of the illustrative embodiments may be performed by processing unit 806 using computer implemented instructions, which may be located in a memory, such as, for example, main memory 808, read only memory 824, or in one or more peripheral devices.

Furthermore, in one case, code 826A may be downloaded over network 801A from remote system 801B, where similar code 801C is stored on a storage device 801D. in another case, code 826A may be downloaded over network 801A to remote system 801B, where downloaded code 801C is stored on a storage device 801D.

The hardware in FIGS. 7-2 may vary depending on the implementation. Other internal hardware or peripheral devices, such as flash memory, equivalent non-volatile memory, or optical disk drives and the like, may be used in addition to or in place of the hardware depicted in FIGS. 7-2. In addition, the processes of the illustrative embodiments may be applied to a multiprocessor data processing system.

In some illustrative examples, data processing system 800 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 808 or a cache, such as the cache found in North Bridge and memory controller hub 802. A processing unit may include one or more processors or CPUs.

The depicted examples in FIGS. 7-2 and above-described examples are not meant to imply architectural limitations. For example, data processing system 800 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 800 using virtualized manifestation of some or all components depicted in data processing system 800. For example, in a virtual machine, virtual device, or virtual component, processing unit 806 is manifested as a virtualized instance of all or some number of hardware processing units 806 available in a host data processing system, main memory 808 is manifested as a virtualized instance of all or some portion of main memory 808 that may be available in the host data processing system, and disk 826 is manifested as a virtualized instance of all or some portion of disk 826 that may be available in the host data processing system. The host data processing system in such cases is represented by data processing system 800.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   establishing a resource database, the resource database comprising data indicating assigned allocations of computing resources to a plurality of functions;
   receiving, by a computer resource manager, a function call and checking whether a scheduler previously selected any computing resource for hosting a function of the function call;
   checking, by the computer resource manager, for stored information in the resource database to determine whether the function of the function call is assigned any portion of computing resources;
   upon a determination that the function is not assigned to any portion of computer resources, issuing a deployment request to deploy the function;
   extracting, by a scheduler, function-tag data associated with the function identified by the deployment request, wherein a first rule in the function-tag data identifies a particular computing component in a plurality of computing components that must be available on a computing resource that hosts the function, each computing component in the plurality of computing components being associated with a function-tag, and
   wherein a second rule in the function-tag data identifies a tag-matching rule indicating whether to invoke a hard enforcement of the first rule or a soft enforcement of the first rule, the hard enforcement indicating that a host must satisfy the first rule, and the soft enforcement indicating that the host need not satisfy the first rule;
   selecting, by the scheduler based on the tag-matching rule, a computing device within a server cluster to host the function based at least in part on a comparison of the function-tag data and host-tag data associated with the computing device,
   wherein the host-tag data indicates whether the particular computing component is present in the plurality of computing components in the computing device, each computing component in the plurality of computing components being associated with a host-tag; and issuing, by the scheduler, an instruction to the computing device, wherein the issuing of the instruction causes an allocation of resources for hosting execution of the function.

2. The method of claim 1, further comprising:
updating the resource database by adding data indicating that the function is being hosted by the computing device.

3. The method of claim 1, further comprising:
searching computing resources tag data for host-tag data that most closely matches the function-tag data.

4. The method of claim 1, further comprising:
identifying an indication of a third rule in the function-tag data indicating that the function is not to be placed with another function when deploying the function.

5. The method of claim 1, wherein the particular computing component that must be available on a computing resource that hosts the function includes at least one of a graphical processing unit, operating system, memory type, and network adapter.

6. The method of claim 1, further comprising:
identifying an indication of a third rule in the function-tag data indicating a situational enforcement policy related to at least one of server availability, geographic proximity, and load balancing when deploying the function.

7. The method of claim 1, wherein the identifying, by the scheduler, of the computing device to host the function comprises:
detecting that the computing device satisfies the first rule in the function-tag data; and
detecting that the computing device does not satisfy the second rule in the function-tag data.

8. The method of claim 7, wherein the detecting that the computing device satisfies the first rule comprises identifying a portion of the host-tag data indicating a presence of the particular computing component that must be available on the computing resource that hosts the function.

9. The method of claim 1, further comprising:
receiving the request as a deployment request that includes source code for the function,
wherein the extracting, by a scheduler, of the function-tag data comprises parsing the deployment request into data segments and detecting the function-tag data in at least one of the data segments.

10. The method of claim 1, further comprising:
defining a set of placement tags, the set of placement tags comprising a set of function-tags and a set of host-tags;
assigning each function of a set of functions with a corresponding function-tag of the set of function tags; and
assigning each compute infrastructure node of a set of compute infrastructure nodes with a corresponding host-tag of the set of host-tags.

11. A computer program product comprising one or more computer readable storage media, and program instructions collectively stored on the one or more computer readable storage media, the program instructions executable by a processor to cause the processor to perform operations comprising:
establishing a resource database, the resource database comprising data indicating assigned allocations of computer resources to a plurality of functions;
receiving, by a computer resource manager, a function call and checking whether a scheduler previously selected any computing resources for hosting a function of the function call;
checking, by the computer resource manager, for stored information in the resource database to determine whether the function of the function call is assigned any particular computer resources;
upon a determination that the function is not assigned to any particular computer resources, issuing a deployment request to deploy the function;
extracting, by the scheduler, function-tag data associated with the function identified by a deployment request,
wherein a first rule in the function-tag data identifies a particular computing component in a plurality of computing components that must be available on a computing resource that hosts the function, each computing component in the plurality of computing components being associated with a function-tag, and
wherein a second rule in the function-tag data identifies a tag-matching rule indicating whether to invoke a hard enforcement of the first rule or a soft enforcement of the first rule, the hard enforcement indicating that a host must satisfy the first rule, and the soft enforcement indicating that the host need not satisfy the first rule;
selecting, by the scheduler based on the tag-matching rule, a computing device within a server cluster to host the function based at least in part on a comparison of the function-tag data and host-tag data associated with the computing device,
wherein the host-tag data indicates whether the particular computing component is present in the plurality of computing components in the computing device, each computing component in the plurality of computing components being associated with a host-tag; and
issuing, by the scheduler, an instruction to the computing device, wherein the issuing of the instruction causes an allocation of resources for hosting execution of the function.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

14. The computer program product of claim 11, further comprising:
searching computing resources tag data for host-tag data that most closely matches the function-tag data.

15. The computer program product of claim 11, further comprising:
identifying an indication of a third rule in the function-tag data indicating that the function is not to be placed with another function when deploying the function.

16. The computer program product of claim 11, further comprising:
receiving the request as a deployment request that includes source code for the function,
wherein the extracting, by a scheduler, of the function-tag data comprises parsing the deployment request into data segments and detecting the function-tag data in at least one of the data segments.

17. The computer program product of claim 11, further comprising:
defining a set of placement tags, the set of placement tags comprising a set of function-tags and a set of host-tags;
assigning each function of a set of functions with a corresponding function-tag of the set of function tags; and
assigning each compute infrastructure node of a set of compute infrastructure nodes with a corresponding host-tag of the set of host-tags.

18. A computer system comprising a processor and one or more computer readable storage media, and program instructions collectively stored on the one or more computer readable storage media, the program instructions executable by the processor to cause the processor to perform operations comprising:
establishing a resource database, the resource database comprising data indicating assigned allocations of computer resources to a plurality of functions;
receiving, by a computer resource manager, a function call and checking whether a scheduler previously selected a computer resource for hosting a function of the function call;
checking, by the computer resource manager, for stored information in the resource database to determine whether the function of the function call is assigned a portion of computer resources;
upon a determination that the function is not assigned to any portion of computer resources, issuing a deployment request to deploy the function;
extracting, by the scheduler, function-tag data associated with the function identified by the deployment request,
wherein a first rule in the function-tag data identifies a particular computing component in a plurality of computing components that must be available on a computing resource that hosts the function, each computing component in the plurality of computing components being associated with a function-tag, and
wherein a second rule in the function-tag data identifies a tag-matching rule indicating whether to invoke a hard enforcement of the first rule or a soft enforcement of the first rule, the hard enforcement indicating that a host must satisfy the first rule, and the soft enforcement indicating that the host need not satisfy the first rule;
selecting, by the scheduler based on the tag-matching rule, a computing device within a server cluster to host the function based at least in part on a comparison of the function-tag data and host-tag data associated with the computing device,
wherein the host-tag data indicates whether the particular computing component is present in the plurality of computing components in the computing device, each computing component in the plurality of computing components being associated with a host-tag; and
issuing, by the scheduler, an instruction to the computing device, wherein the issuing of the instruction causes an allocation of resources for hosting execution of the function.

19. The computer system of claim 18, further comprising:
searching computing resources tag data for host-tag data that most closely matches the function-tag data.

20. The computer system of claim 18, further comprising:
identifying an indication of a third rule in the function-tag data indicating that the function is not to be placed with another function when deploying the function.

21. The computer system of claim 18, further comprising:
defining a set of placement tags, the set of placement tags comprising a set of function-tags and a set of host-tags;
assigning each function of a set of functions with a corresponding function-tag of the set of function tags; and
assigning each compute infrastructure node of a set of compute infrastructure nodes with a corresponding host-tag of the set of host-tags.

* * * * *